Figure 1:
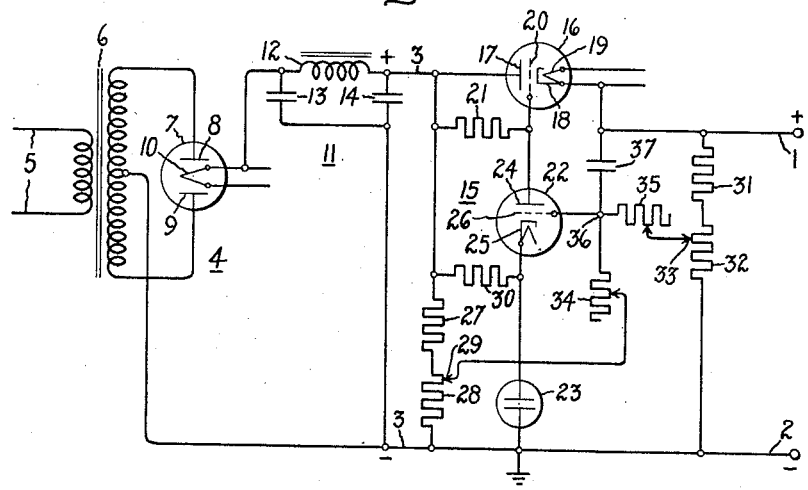

June 24, 1941.  P. C. GARDINER  2,247,082

ELECTRONIC VOLTAGE REGULATOR

Filed March 29, 1939

Inventor:
Paul C. Gardiner,
by Harry E. Dunham
His Attorney.

UNITED STATES PATENT OFFICE 2,247,082

ELECTRONIC VOLTAGE REGULATOR

Paul C. Gardiner, Scotia, N. Y., assignor to General Electric Company, a corporation of New York Application March 29, 1939, Serial No. 264,758

10 Claims. (Cl. 171—312)

My invention relates to electric valve circuits and more particularly to electronic voltage regulators.

Electronic voltage regulators are being applied to applications where it is desirable to maintain the load voltage within a narrowly defined range of values. Not only is it important to provide a regulating or controlling circuit which maintains the load voltage at a substantially constant value, but it is also important to provide a simple and rugged circuit which readily permits adjustment of the output characteristic. For example, in some applications it is highly desirable to change or adjust the load-voltage characteristic of the associated load circuit. Of course, the regulator must be adjustable to obtain this flexibility in control. In some applications it is desirable that the voltage remain substantially constant throughout the entire range of load, and in other applications it is desirable that the load voltage rise or fall at a predetermined rate as the load is increased. Voltage regulators generally have two functions; one of these functions is to regulate the load voltage as the load impedance varies and the other function is to regulate the load voltage as the supply voltage varies. The prior art arrangements have been difficult to adjust or control where it is desired to separate the two functions, that is to effect or obtain selection between the two functions. In accordance with the teachings of my invention described hereinafter, I provide new and improved electronic voltage regulators in which different types of compound may be effected and in which the relative effect of the above-mentioned functions may be adjusted or controlled.

It is an object of my invention to provide a new and improved electric valve circuit.

It is another object of my invention to provide a new and improved electronic voltage regulator.

It is a further object of my invention to provide a new and improved electronic voltage regulator for controlling the voltage impressed on a direct current load circuit.

It is a still further object of my invention to provide a new and improved electronic voltage regulator which is readily adjustable or controllable to maintain the load voltage precisely constant or to effect any desired over-compounding or under-compounding of the voltage impressed on the load circuit.

In accordance with the illustrated embodiments of my invention, I have shown several forms of a new and improved electronic voltage regulator for controlling the voltage of a direct current load circuit supplied from a direct current supply circuit. The electronic voltage regulator comprises an electronic discharge device having an anode-cathode circuit connected in series relation with the conductors of corresponding polarity of the supply circuit and the load circuit, and comprises a control member which controls the current conducted by the discharge device and accordingly controls the voltage impressed on the load circuit. The potential impressed on the control member is controlled by means of a resistance connected between the positive terminal of the supply circuit and the control member of the electronic discharge device. A second electronic discharge device of the controlled type comprising a grid transmits variable amounts of unidirectional current through the resistance and controls the potential of the control member. A constant voltage device, such as a glow discharge valve, is connected between the negative terminals of the supply circuit and the load circuit and the cathode of the second electronic discharge device and maintains the cathode at a substantially constant potential above that of the negative terminals. In order to control precisely the voltage of the load circuit to maintain the voltage constant when such regulation is desired, or in order to effect any desired degree of over-compounding or under-compounding, I provide an arrangement for energizing the grid of the second electronic discharge device in accordance with the voltages of both the supply circuit and the load circuit. A voltage divider is connected across the supply circuit and impresses on the control grid a component of voltage which varies as the voltage of the supply circuit; and a second voltage divider is connected across the load circuit and impresses on the control grid a second component of voltage which varies as the voltage of the load circuit. Variable impedance or variable resistance means are connected between points of the voltage dividers to control the respective values of the components of voltage which are impressed on the control grid; that is, the effect of the respective components impressed on the control grid is determined by the variable impedance or variable resistance means.

Figure 2:
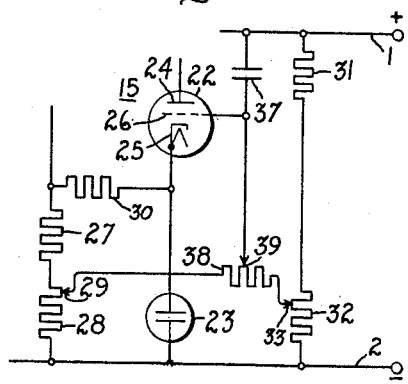

For a better understanding of my invention, reference may be had to the following description taken in connection with the accompanying drawing and its scope will be pointed out in the appended claims. Fig. 1 of the accompanying drawing diagrammatically illustrates an embodiment of my invention as applied to an electronic voltage regulator for controlling the voltage of a direct current load circuit energized from a direct current supply circuit. Fig. 2 diagrammatically illustrates a modification of the arrangement of Fig. 1 in which ready adjustment of the voltage-current characteristic of the load circuit may be effected.

Referring now to Fig. 1 of the accompanying drawing, my invention is there illustrated as applied to an electronic voltage regulator for controlling the voltage impressed on a direct current load circuit comprising conductors 1 and 2, and which is energized from a direct current supply circuit 3. The direct current supply circuit 3 may be energized from any suitable means, such as a rectifier 4, energized in turn from an alternating current supply circuit 5. The rectifier 4 may comprise a transformer 6 and electric valve 7 comprising anodes 8 and 9 and a cathode 10. The output of the rectifier 4 may be transmitted through a suitable filter circuit 11 which comprises an inductance 12 and capacitances 13 and 14. Inasmuch as the rectifier 4 and the associated filter circuit 11 comprises an appreciable impedance, the voltage of the supply circuit 3 will vary appreciably as the load varies.

As a means for maintaining the voltage of the direct current load circuit constant or as a means for obtaining any desired over-compounding or under-compounding of the voltage impressed on the load circuit, I provide an electronic voltage regulator 15. The electronic voltage regulator 15 not only provides an arrangement for obtaining any desired compounding of the voltage of the load circuit as the load resistance varies but also compensates for variations in the supply voltage. Electronic voltage regulator 15 comprises suitable translating apparatus for controlling the voltage of the load circuit. This translating apparatus may comprise an electronic discharge device 16, preferably of the high vacuum type, comprising an anode 17, a cathode 18, a cathode heating element 19 and suitable control means such as a control member 20. The potential of the control member 20, and hence the conductivity of the electronic discharge device 16, are controlled by means of a suitable impedance element, such as a resistance 21, which is connected between one terminal of the supply circuit and the control member 20. A second electronic discharge device 22 and a constant potential device, such as a glow discharge valve 23, are connected in series relation with the resistance 21 and transmit variable amounts of current therethrough in order to control the potential of the control member 20. The electronic discharge device 22 comprises a pair of principal electrodes, such as an anode 24 and a cathode 25, one of which is connected to one terminal of the supply circuit or the load circuit through the glow discharge valve 23. In Fig. 1 the cathode 25 is shown as being connected to the negative terminals of the supply circuit and the load circuit. Electronic discharge device 22 also comprises a control grid 26 which controls the amount of current conducted thereby and conducted through resistance 21.

As a means for controlling the potential of control grid 26 in order to maintain the voltage of the load circuit constant or as a means for effecting any desired over-compounding or under- compounding of the voltage supplied to the load circuit, I provide apparatus for energizing the control grid 26 conjointly in accordance with an electrical condition of the supply circuit and an electrial condition of the load circuit. This apparatus, which may comprise a voltage responsive bridge, permits an adjustment or control of the electronic voltage regulator 15 to control the load voltage as the load resistance varies, and to control the load voltage as the supply voltage varies and includes means for obtaining the desired compromise in effect between load resistance variation and supply voltage variation. A pair of voltage dividers, one responsive to the supply voltage and the other responsive to the load voltage, conjointly control the potential impressed on the control grid of electronic discharge device 22. More specifically, I provide means conjointly responsive to the voltage of the supply circuit and the voltage of the load circuit for impressing on control grid 26 of electronic discharge device 22 a control voltage which is the resultant of components of the voltages of the supply circuit and the load circuit, thereby providing means for maintaining the voltage of the load circuit substantially constant or for effecting any desired over-compounding or under-compounding of that voltage. I provide suitable means, such as a voltage divider, which is responsive to the voltage of the supply circuit 3. The voltage divider may comprise a pair of serially connected resistances 27 and 28 having an adjustable intermediate connection or tap 29, the potential of which varies in accordance with a predetermined component of the voltage of the supply circuit 3. A stabilizing resistance 30 may be connected between the voltage divider and the cathode 25 of electronic discharge device 22. I also provide suitable means responsive to the voltage of the load circuit comprising conductors 1 and 2, such as a voltage divider including serially connected resistances 31 and 32 having an intermediate adjustable connection or tap 33, the potential of which varies in accordance with a predetermined component of voltage derived from the load circuit.

To control the relative magnitudes of the above-mentioned components of voltage and to control the effectiveness of said components upon the control of the electronic discharge device 22, I provide suitable variable impedance means connected between intermediate taps 29 and 33 of the voltage dividers. For example, I may employ adjustable resistances 34 and 35 connected to intermediate taps 29 and 33, respectively. The common juncture 36 of the adjustable resistances 34 and 35 is connected to control grid 26 of electronic discharge device 22, and the common juncture 36 may also be connected to the positive terminal of the load circuit through a capacitance 37 which permits rapid variations in the potential of grid 26, in order that precise and rapid control of the output voltage of the regulator may be effected.

The operation of the embodiment of my invention shown in Fig. 1 will be explained by considering the system when it is operating to transmit a substantially constant voltage to the direct current circuit, comprising conductors 1 and 2, from the supply circuit 3. By the proper adjustment of the adjustable resistances 34 and 35, the voltage impressed on the load circuit may be maintained at a substantially constant value. The voltage impressed on the load circuit comprising conductors 1 and 2 is determined by the conductivity of the electronic discharge device 16, which in turn is controlled by the potential of its control member 20. The potential of the control member 20 is determined by the current conducted by resistance 21, and the amount of current conducted through resistance 21 is determined by the conductivity of electronic discharge device 22. Over-compounding or flat-compounding is obtained here due to the fact that the potential of negative terminal 3 drops relatively rapidly, with respect to the potential of point 1, as the load resistance is varied. Hence the circuit employs the feature of deriving a control potential for grid 26 from the negative terminal 3. Inasmuch as the cathode 25 of electronic discharge device 22 is connected to the negative terminal of the supply circuit or the load circuit through the glow discharge valve 23, its potential remains substantially fixed in value above that of terminal 3 and the variation in the control potential impressed on grid 26 is substantially entirely effective in controlling the conductivity of this discharge device.

The voltage divider comprising resistances 27 and 28 produces a component of voltage which varies as the voltage of the supply circuit and tends to decrease the voltage of the load circuit as the voltage of the supply circuit increases. On the other hand, the component of voltage produced by the voltage divider comprising resistances 31 and 32 tends to lower or reduce the voltage of the load circuit as the voltage of the load circuit increases. It is, therefore, to be understood that the effects of the two components of voltage impressed on the control grid 26 are in opposition, and by controlling the relative magnitudes of these components the output characteristic of the regulator 15 or the voltage-current characteristic of the load circuit may be controlled or adjusted. For example, by the proper adjustment of the resistances 34 and 35, the voltage impressed on the load circuit may be maintained absolutely constant or the load may be over-compounded or under-compounded. In other words, the adjustment of the regulator 15 depends upon the ratio between resistances 34 and 35. If the resistance 34 is increased substantially and approaches infinity as a limit, the voltage divider comprising resistances 27 and 28 is substantially ineffective and the control is obtained almost entirely from the voltage divider including resistances 31 and 32. In other words, if the value of resistance 34 is very large, the regulator operates substantially solely in response to the voltage of the load circuit and the component of voltage derived from the voltage divider connected across the load circuit tends to increase the output voltage as the output voltage decreases, and conversely tends to increase the output voltage as the output voltage decreases. On the other hand, if the value of resistance 35 is made very large approaching infinity as a limit, the control is effected substantially entirely from the supply circuit 3 through voltage divider including resistances 27 and 28. If the supply voltage rises under this condition, the voltage of the load circuit decreases. Conversely, if the supply circuit voltage decreases, the voltage of the load circuit increases. Therefore, by the adjustment of the resistances 34 and 35, the nature or type of the voltage-current characteristic of the load circuit or the characteristic of the electronic regulator 15 may be adjusted or controlled.

Fig. 2 diagrammatically illustrates a modification of the embodiment of my invention shown in Fig. 1. Certain elements shown in the arrangement of Fig. 2 correspond to elements in the arrangement of Fig. 1 and have been assigned like reference numerals. As a means for controlling the nature of the voltage-current characteristic, or, in other words, as a means for controlling the operating characteristics of the electronic voltage regulator 15, I provide a suitable means for controlling the ratio of the components of voltage derived from the two voltage dividers. This means for controlling the ratio of the effective values of resistances 34 and 35 may comprise an adjustable impedance, such as a resistance 38, connected between intermediate taps 29 and 33 of the voltage dividers and may be provided with an adjustable tap 39 which is connected to control grid 26 of electronic discharge device 22 and capacitance 37. It is to be understood that by positioning the tap 39, the ratio between the respective portions of the resistance 38 may be controlled or adjusted and that the effect of the respective components of voltage derived from the two voltage dividers may be pre-established or pre-set.

The embodiment of my invention shown in Fig. 2 operates in substantially the same manner as that explained above in connection with Fig. 1. The adjustable tap 39 of resistance 38 may be positioned to control the characteristic of the voltage-current characteristic of the load circuit or of the electronic voltage regulator 15. For example, the tap 39 may be positioned so that the load voltage remains substantially constant throughout the range of load, or the tap 39 may be positioned to effect under-compounding or over-compounding of the voltage impressed on the load circuit.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a supply circuit, a load circuit, electric translating apparatus connected between said circuits and comprising control means, an electronic discharge device for controlling the potential of said control means and including a grid, a voltage divider connected across said supply circuit and having an intermediate tap for supplying a component of voltage which varies as the voltage of said supply circuit, a second voltage divider connected across said load circuit and having an intermediate tap for supplying a component of voltage which varies as the voltage of said load circuit, and means comprising a resistance connected between said intermediate taps to control the relative magnitudes of said components which are impressed on said grid.

2. In combination, a supply circuit, a load circuit, an electronic discharge device connected between said circuits for controlling the voltage of said load circuit and comprising a control member for controlling the conductivity thereof, an impedance element connected between said supply circuit and said control member for controlling the potential impressed thereon, a second electronic discharge device connected in series relation with said impedance element for transmitting variable amounts of current therethrough, said second discharge device having a control member, means for providing voltages which are predetermined components of the voltages of said supply circuit and said load circuit, and a variable resistance connected between said last mentioned means for adjusting the relative magnitudes of said components to establish a predetermined voltage-current characteristic of said load circuit.

3. In combination, a supply circuit, a load circuit, an electronic discharge device connected between said circuits for controlling the voltage of said load circuit and comprising a control member for controlling the conductivity thereof, an impedance element connected between said supply circuit and said control member for controlling the potential impressed thereon, a second electronic discharge device connected in series relation with said impedance element for transmitting variable amounts of current therethrough, said second discharge device having a control member, means connected across said supply circuit for impressing on said control member of said second discharge device a voltage which varies in accordance with the voltage of said supply circuit, means connected across said load circuit for superimposing on said last mentioned voltage a voltage which is a predetermined component of the voltage of said load circuit, and means including a variable resistance connected between the last two mentioned means for adjusting the relative magnitude of the components of voltage derived from said supply circuit and said load circuit to establish a predetermined voltage-current characteristic of said load circuit.

4. In combination, a supply circuit, a load circuit, a variable impedance electronic discharge device connected between said circuits and comprising a control member for controlling the conductivity thereof, an impedance element connected between said supply circuit and said control member for controlling the potential thereof, a second electronic discharge device connected in series relation with said impedance element for transmitting variable amounts of unidirectional current therethrough and comprising a control grid, a voltage divider connected across said supply circuit for impressing on said grid a voltage which varies in accordance with the voltage of said supply circuit, a resistance connected between said voltage divider and said grid, a second voltage divider connected across said load circuit for impressing on said grid a voltage which varies as the voltage of said load circuit, a resistance connected between said second voltage divider and said control grid, and means for adjusting said resistances to control an electrical condition of said load circuit.

5. In combination, a supply circuit, a load circuit, an electronic discharge device connected between said circuits for controlling the voltage of said load circuit and comprising a control member, an impedance element connected between said supply circuit and said control member for controlling the potential of said control member, a second electronic discharge device connected in series relation with said impedance element for conducting variable amounts of current therethrough and comprising a pair of principal electrodes and a control grid, a constant potential device connected between one of said principal electrodes and one terminal of said supply circuit, and means for impressing on said control grid a voltage which is a resultant of the voltages of said supply circuit and said load circuit.

6. In combination, a supply circuit, a load circuit, a variable resistance electronic discharge device connected between said circuits for controlling the voltage of said load circuit and comprising a control member, an impedance element connected between said supply circuit and said control member for controlling the potential of said control member, a second electronic discharge device connected in series relation with said impedance element for conducting variable amounts of current therethrough and comprising a pair of principal electrodes and a control grid, a constant potential device connected between one of said principal electrodes and one terminal of said load circuit, a voltage divider connected across said supply circuit for impressing on said control grid a voltage which varies as the voltage of said supply circuit, a resistance connected between said voltage divider and said grid, a second voltage divider connected across said load circuit for impressing on said grid a voltage which varies as the voltage of said load circuit, and a second resistance connected between said second voltage divider and said grid.

7. In combination, a supply circuit, a load circuit, a variable resistance electronic discharge device connected between said circuits for controlling the voltage of said load circuit and comprising a control member, an impedance element connected between said supply circuit and said control member for controlling the potential of said control member, a second electronic discharge device connected in series relation with said impedance element for conducting variable amounts of current therethrough and comprising a pair of principal electrodes and a control grid, a constant potential device connected between one of said principal electrodes and one terminal of said load circuit, a voltage divider connected across said supply circuit for impressing on said control grid a voltage which varies as the voltage of said supply circuit, a resistance connected between said voltage divider and said grid, a second voltage divider connected across said load circuit for impressing on said grid a voltage which varies as the voltage of said load circuit, a second resistance connected between said second voltage divider and said grid, and means for adjusting said resistances to control the voltage-current characteristic of said load circuit.

8. In combination, a supply circuit, a load circuit, a variable resistance electronic discharge device connected between said circuits for controlling the voltage of said load circuit and comprising a control member for controlling the conductivity thereof, an impedance element connected between said supply circuit and said control member for controlling the voltage impressed thereon, a second electronic discharge device connected in series relation with said impedance element for transmitting variable amounts of current therethrough, said second discharge device having a control grid, and means for controlling the potential of said grid in accordance with the voltages of said supply circuit and said load circuit and comprising a voltage responsive bridge one branch of which is energized from said supply circuit and the other branch of which is energized from said load circuit.

9. In combination, a supply circuit, a load circuit, a variable resistance electronic discharge device connected between said circuits for controlling the voltage of said load circuit and comprising a control member for controlling the conductivity thereof, an impedance element connected between said supply circuit and said control member for controlling the voltage impressed thereon, a second electronic discharge device connected in series relation with said impedance element for transmitting variable amounts of current therethrough, said second discharge device having a control grid, a voltage divider connected across said supply circuit and having an intermediate tap, a second voltage divider connected across said load circuit and having an intermediate tap, and variable resistance means connected between said intermediate taps of said voltage dividers to impress on said control grid a voltage which is a resultant of components of the voltages of said supply circuit and said load circuit.

10. In combination, a supply circuit, a load circuit, a variable resistance electronic discharge device connected between said circuits for controlling the voltage of said load circuit and comprising a control member for controlling the conductivity thereof, an impedance element connected between said supply circuit and said control member for controlling the voltage impressed thereon, a second electronic discharge device connected in series relation with said impedance element for transmitting variable amounts of current therethrough, said second discharge device having a control grid, a voltage divider connected across said supply circuit and having an intermediate tap, a second voltage divider connected across said load circuit and having an intermediate tap, a resistance connected between said intermediate taps of said voltage dividers, and means for controlling the effective ratio of portions of said resistance to control the voltage-current characteristic of said load circuit.

PAUL C. GARDINER.